United States Patent [19]
Gibson et al.

[11] Patent Number: 6,006,193
[45] Date of Patent: *Dec. 21, 1999

[54] COMPUTER EXECUTABLE WORKFLOW CONTROL SYSTEM

[76] Inventors: Kenneth U. Gibson, 2960 S. 3095 W., West Valley City, Utah 84119; William N. Turley, 8086 Finlandia Way, Sandy, Utah 84093; Jonathan Schapiro, 34 Pilgrims Path, Sudbury, Mass. 01776

[*] Notice: This patent issued on a continued prosecution application filed under 37 CFR 1.53(d), and is subject to the twenty year patent term provisions of 35 U.S.C. 154(a)(2).

[21] Appl. No.: 08/769,503

[22] Filed: Dec. 18, 1996

(Under 37 CFR 1.47)

[51] Int. Cl.$^6$ .................................................... G06F 17/60
[52] U.S. Cl. ................................. 705/8; 707/10; 707/201
[58] Field of Search ................................. 705/1, 2, 3, 4, 705/5, 6, 7, 8, 9, 10, 11, 12, 13, 14; 707/1, 2, 9, 10, 100, 104, 201

[56] References Cited

U.S. PATENT DOCUMENTS

| | | | |
|---|---|---|---|
| 5,168,444 | 12/1992 | Cukor et al. | 705/1 |
| 5,182,705 | 1/1993 | Barr et al. | 705/11 |
| 5,191,522 | 3/1993 | Bosco et al. | 705/4 |
| 5,191,525 | 3/1993 | LeBrun et al. | 707/500 |
| 5,208,748 | 5/1993 | Flores et al. | 704/1 |
| 5,301,320 | 4/1994 | McAtee et al. | 705/9 |
| 5,319,543 | 6/1994 | Wilhelm | 705/3 |
| 5,319,777 | 6/1994 | Perez | 707/10 |
| 5,446,740 | 8/1995 | Yien et al. | 395/200.77 |
| 5,535,322 | 7/1996 | Hecht | 705/1 |
| 5,630,069 | 5/1997 | Flores et al. | 705/7 |
| 5,706,452 | 1/1998 | Ivanov | 705/8 |

OTHER PUBLICATIONS

Workflow Management Coalition "Workflow Coalition Terminology & Glossary" Jun. 1996 Issue 2.0 pp. 1–59.

*Primary Examiner*—Eric W. Stamber
*Attorney, Agent, or Firm*—Fish & Richardson P.C.

[57] ABSTRACT

To control the processing of a work item, the work item is stored in a database of work items and is executed by an operator. Organizations use the database, and the operator belongs to one of the organizations. Organization identifiers are associated with corresponding organizations, and definitional data items are associated with corresponding organization identifiers. The definitional data items define rules that can be altered after the system is initially configured and while the system is running.

32 Claims, 8 Drawing Sheets

ORGANIZATIONS (40)

| ORG ID | ORG NAME |
|---|---|
| 1 | DIV1 |  ← 44
| 2 | DIV2 |  ← 47
| 3 | DIV3 |
| 4 | DIV4 |
| ⋮ | |

OPERATORS (50)

| ORG ID | OP ID | OP NAME | ASSOC. NODE |
|---|---|---|---|
| 1 | A1 | ADMIN1 | B |  ← 44
| 1 | O1 | OPER1 | E |  ← 44
| 2 | O2 | OPER2 | K |  ← 47
| 3 | O3 | OPER3 | P |
| 4 | O4 | OPER4 | Q |
| ⋮ | | | |

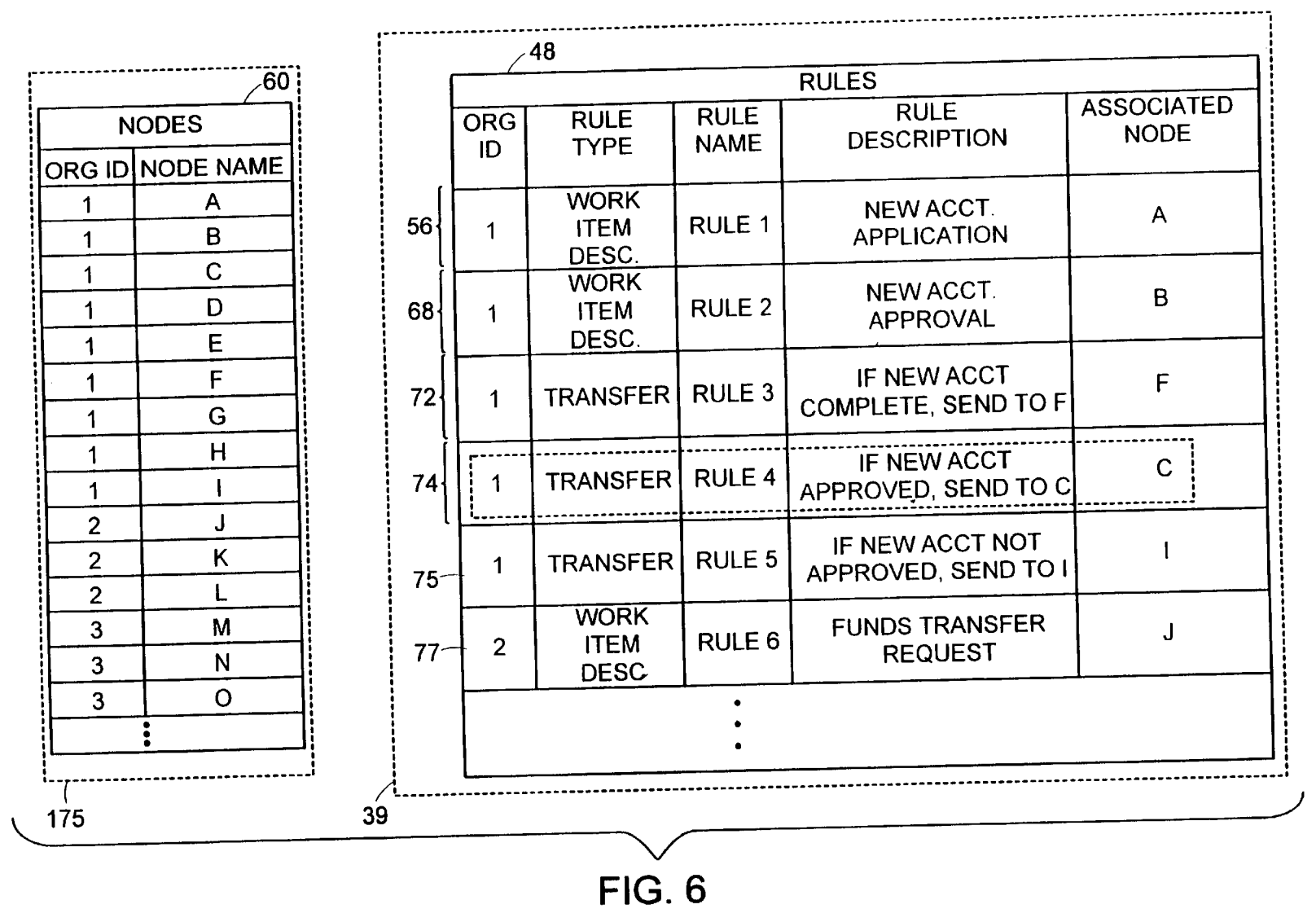

RULES

| ORG ID | RULE TYPE | RULE NAME | RULE DESCRIPTION | ASSOCIATED NODE |
|---|---|---|---|---|
| 1 | WORK ITEM DESC. | RULE 1 | NEW ACCT. APPLICATION | A |
| 1 | WORK ITEM DESC. | RULE 2 | NEW ACCT. APPROVAL | B |
| 1 | TRANSFER | RULE 3 | IF NEW ACCT COMPLETE, SEND TO F | F |
| 1 | TRANSFER | RULE 4 | IF NEW ACCT APPROVED, SEND TO C | C |
| 1 | TRANSFER | RULE 5 | IF NEW ACCT NOT APPROVED, SEND TO I | I |
| 2 | WORK ITEM DESC | RULE 6 | FUNDS TRANSFER REQUEST | J |
| ... | | | | |

NODES

| ORG ID | NODE NAME |
|---|---|
| 1 | A |
| 1 | B |
| 1 | C |
| 1 | D |
| 1 | E |
| 1 | F |
| 1 | G |
| 1 | H |
| 2 | I |
| 2 | J |
| 2 | K |
| 3 | L |
| 3 | M |
| 3 | N |
| 3 | O |
| ... | |

FIG. 6

COMPUTER EXECUTABLE WORKFLOW CONTROL SYSTEM

BACKGROUND OF THE INVENTION

The invention relates generally to computer executable workflow management and control systems and more particularly to computer system executable methods for controlling access to, or processing of, a work item in a database of workflow work items stored by the computer system.

As is known in the art, members of an organization having an organizational structure are provided work items for execution from a database of unexecuted work items. These work items represent tasks such as filling out documents, returning telephone calls to potential or existing customers, initiating transactions, or similar duties. Work items may arrive at the database from outside the organization or from inside the organization or both. For example, if the organization provides financial services, the work items may relate to client account maintenance, buy and sell orders, internal management directives, and the like.

Efficiency gains can be accomplished by implementing a workflow management system that automates a process for distributing the work items to the members of the organization (i.e., operators). The work items are stored in a database. Associated with the work items is definitional data. The definitional data includes a plurality of definitional data items. Each definitional data item includes, for example: information about steps (i.e., nodes) in a process for manipulating the work item; information about a characteristic of a list (i.e., a queue associated with a node) of work items appropriate for execution in connection with a node; information about a rule specifying a protocol for executing the work item, such as a display characteristic for the work item; or information about a characteristic of the operator, or operators, who may work on the work item. In general, a node typically represents a single task in a work environment; for example, the single task may be "submitting new account applications." More particularly, a node represents a unit step of work specified in one or more processes; for example, a process for handling new account applications may have a node representing a unit step being "new account application approval." Each node may be used in more than one process and may be associated with a department having responsibility for the single task or unit step of work.

In the workflow management system, each member of the organization (i.e., each operator) is situated at a computer station, such as a personal computer. The computer stations are connected to a computer system running a workflow application program. The operator requests a work item from the database. After a work item is assigned, processed, displayed in accordance with the definitional data, and then completed by the operator, a new work item is provided from the database to the computer station in response to another request from the computer station.

Some organizations are structured into separate sub-organizations such as departments or divisions or separate business units, with each such sub-organization requiring some control over access to and processing of the sub-organization's work items. For example, the sub-organizations may require different sets of rules governing the flow of work items but may also need to share work items. If the sub-organizations use separate databases to control access and processing, and maintain separate sets of rules, the work items may be shared by making and distributing copies of the work items. In such cases, it is necessary to keep track of the copies and also to ensure cross-database consistency of definitional data concerning the shared work items.

One proposed system allows a single database to be used to store the work items of different sub-organizations. In the proposed system, each sub-organization maintains general access rules unrelated to the specific type of business activity performed by the sub-organization. Further, with the proposed system the access rules maintained by each sub-organization are provided specifically to prevent access by the sub-organization to work items not pertaining to the sub-organization. A change in the structure of the organization or one of the sub-organizations typically requires changes to each sub-organization's access rules.

SUMMARY OF THE INVENTION

In accordance with one aspect of the invention, a computer system executable method is provided for controlling access to, or processing of, a work item. The work item is stored in a database of work items for subsequent execution by at least one operator. The database (perhaps along with some computing resources associated with the database) is used by a plurality of organizations. The operator belongs to one of the organizations. The method stores in a memory a plurality of organization identifiers. Each one of the organization identifiers is associated with a corresponding one of the organizations. Definitional data items are also stored in the memory. Each one of the definitional data items is associated with the one of the organizational identifiers. The method provides the operators with access to, or allows the operators to be affected by, one of the definitional data items only if the operator is associated with the same organization identifier associated with the definitional data item. The definitional data item controls access to, or processing of, the work item.

With this method, because each organization has its own identifier and the definitional data item is associated with one of the identifiers (and hence with a specific organization), establishment of, and subsequent change to, work item flow through a single workflow system used by different organizations is facilitated. For example, an additional organization may be added simply by associating the additional organization with an additional organization identifier in the first memory section. In addition, the method allows efficient use of the workflow system's storage facilities, because multiple organizations' definitional data items may be stored together while remaining logically separate as a result of the organization identifiers.

Implementations of this aspect of the invention may include one or more of the following features. The memory may store a data structure relating each one of the plurality of operators with one of the organization identifiers; and one of the operators of the organization may be provided with access to, or may be affected by, one of the definitional data items only if the data structure stored in the third memory section associates the one of the operators with the same organization identifier associated with the one of the definitional data items. The definitional data item may include: information about a node corresponding to a step in a process for manipulating the work item; a rule specifying a display, transfer, or processing characteristic for the work item; information about a characteristic of the operator; information about a characteristic of a queue associated with a node; or information about a setup component such as an item-type code, a status code, or a value group.

In accordance with another aspect of the invention, another computer system executable method is provided for controlling access to, or processing of, work items. The work items are stored in a database of work items for subsequent execution by operators. The method includes storing in a memory: information defining nodes (e.g., steps, departments, persons) available for use in processing the work items; and a programmable data structure defining an organizational relationship between selected ones of the stored nodes to control the access to, or processing of, the work item. The data structure is programmed to provide the organizational relationship between the nodes to control access to, and processing of, the work item by an operator.

This method allows the progression of work items within an organization to be controlled in accordance with a programmable organizational structure. Such method facilitates assuring that work items are accessible to only selected operators in the organization.

Implementations of this aspect of the invention may include one or more of the following features. The organizational relationship may be hierarchal or matrix-oriented. The operator may be associated with one of the nodes where each node may correspond to a step in a process for manipulating the work item within the organization or sub-organization. The method may further include storing definitional data items used in controlling access to, or processing of, the work item.

In accordance with still another aspect of the invention, a computer system executable method is provided for controlling access to, or processing of, a work item. The work item is stored in a database of work items for subsequent execution by an operator in accordance with definitional data stored in the database. The method includes storing in a hierarchy memory section a networked data structure (e.g., a tree data structure) having networked entries (e.g., tree entries). The networked data structure corresponds to an organization having nodes for manipulation of work items. The nodes correspond to steps used to process a work item and may represent, for example, departments within an organization or sub-organization, or persons within a department. The organization is organized hierarchally and each networked entry corresponds to one of the nodes. A process memory section stores a process table specifying a sequence of steps for manipulating the work item by the nodes. A definitional data item memory section stores a definitional data item associated with the nodes.

With such an arrangement, when a request is received to store in the definitional data item memory section a new definitional data item which is intended to be associated with one of the nodes in violation of the hierarchial structure stored in the hierarchy memory section, the system prevents storage of such violative definitional data item. Thus, because access and processing control is established at a time when the organization is set up (i.e., when the hierarchy memory section and the definitional data items are established), as opposed to checking each such work item at a subsequent time when such work items are progressing through the system, this method allows a hierarchal organization to easily control access to, or processing of, work items by placing restrictions on definitional data that will be accepted for storage. Thus, access and processing control is made robust by allowing the organization to establish such control at a time when the organization is setting up (i.e., defining) a workflow system for manipulating work items or is modifying the setup of the workflow system, as opposed to checking each such work item at a subsequent time as mentioned before.

BRIEF DESCRIPTION OF THE DRAWINGS

Other features and advantages of the invention, as well as the invention itself, will become more readily apparent when read together with the following detailed description taken together with the accompanying drawings, in which:

FIGS. 5–7 are block diagrams of data structures and organizational structures used in the methods of FIGS. 2–4;

DESCRIPTION OF THE PREFERRED EMBODIMENTS

Figure 1:
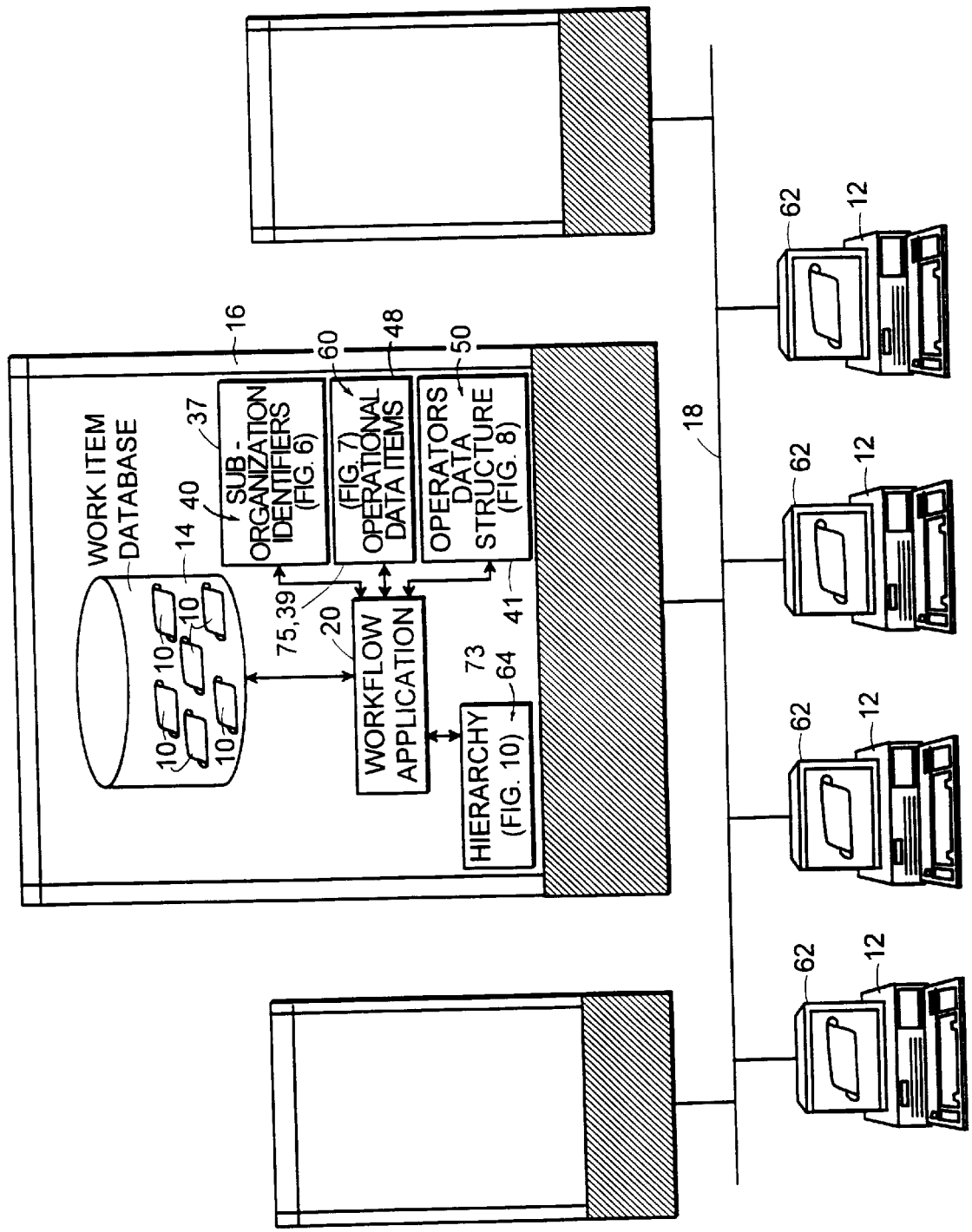
FIG. 1 is a block diagram of a computer system for execution of the methods according to the invention.
Figure 2:
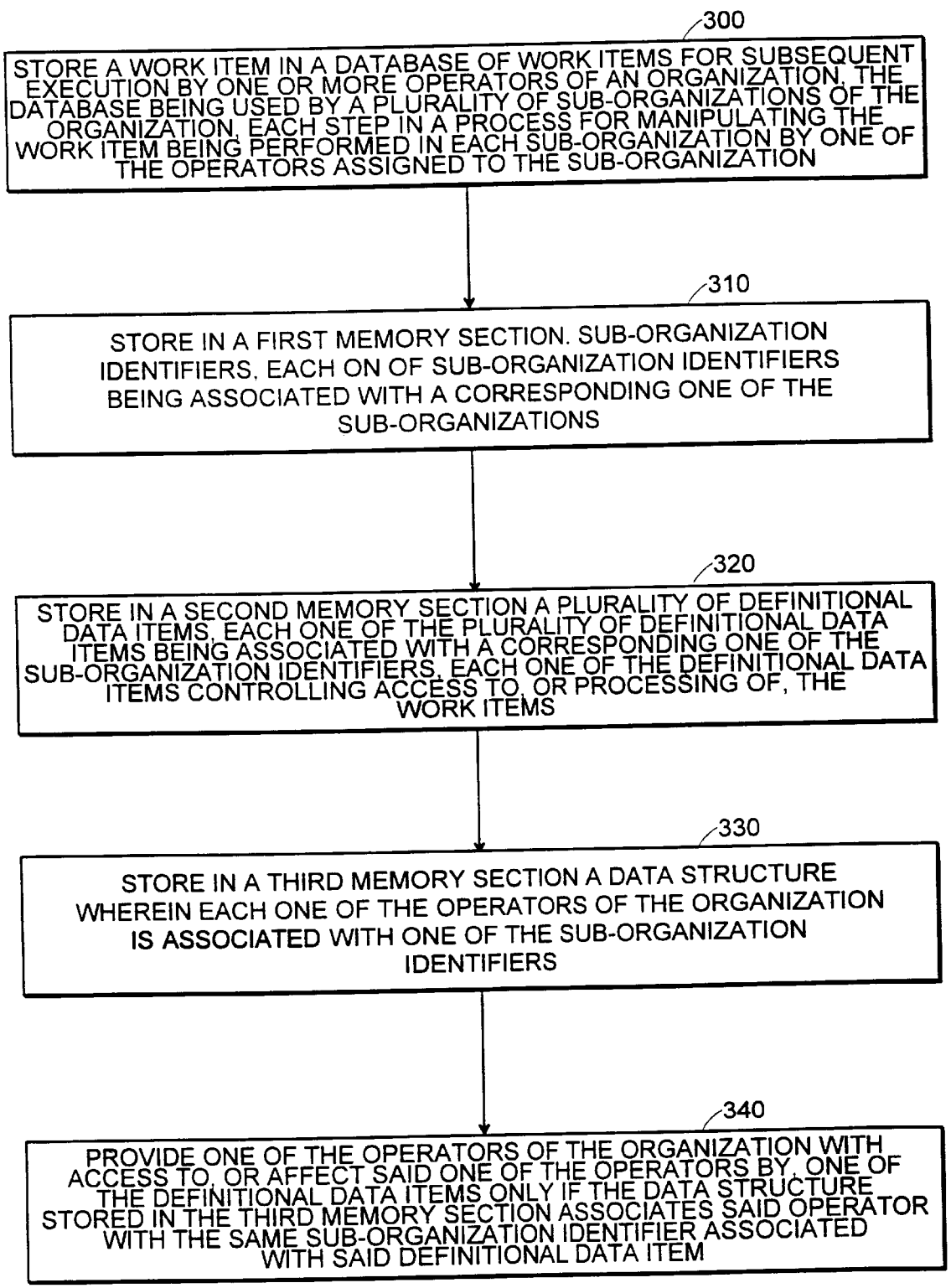
FIGS. 2–4 are flow diagrams of methods for controlling access to a workflow work item in a database of work items stored by the computer system of FIG. 1 according to the invention.
Figure 3:
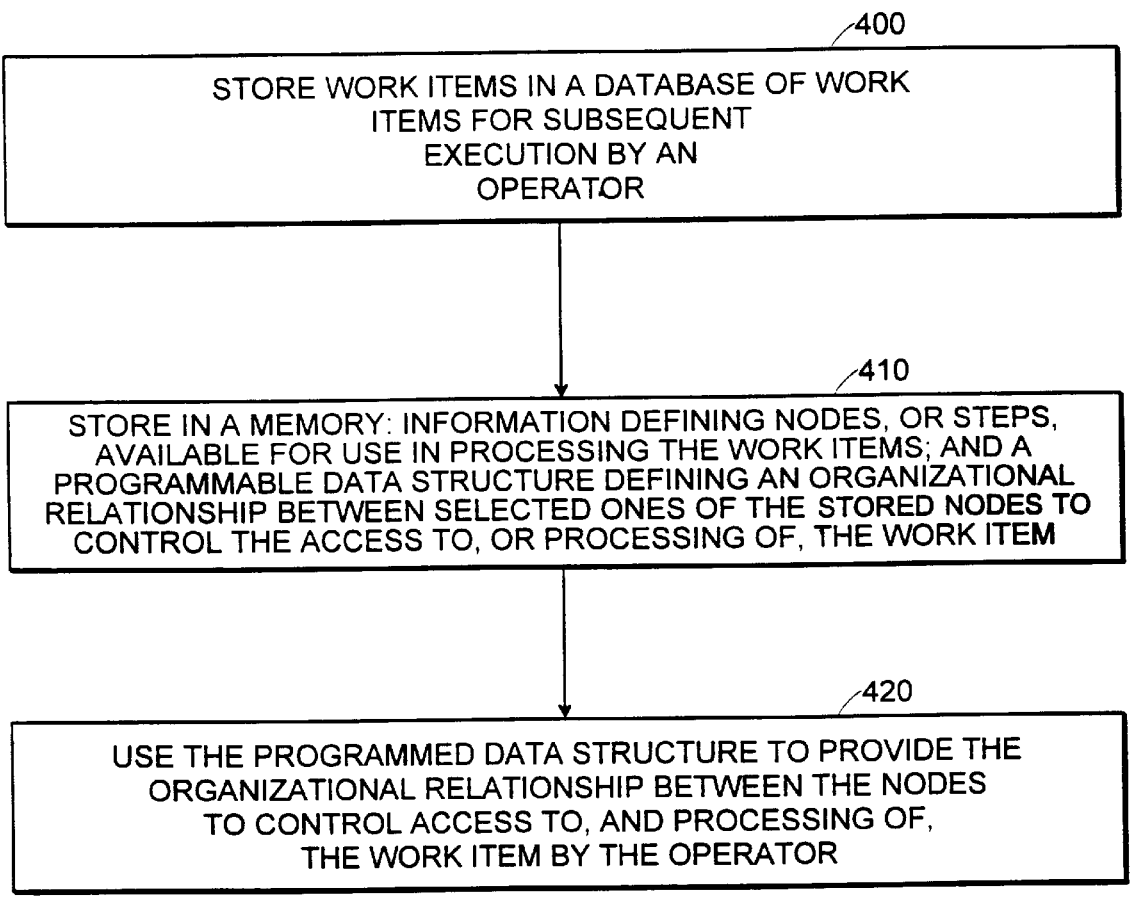
Figure 4:
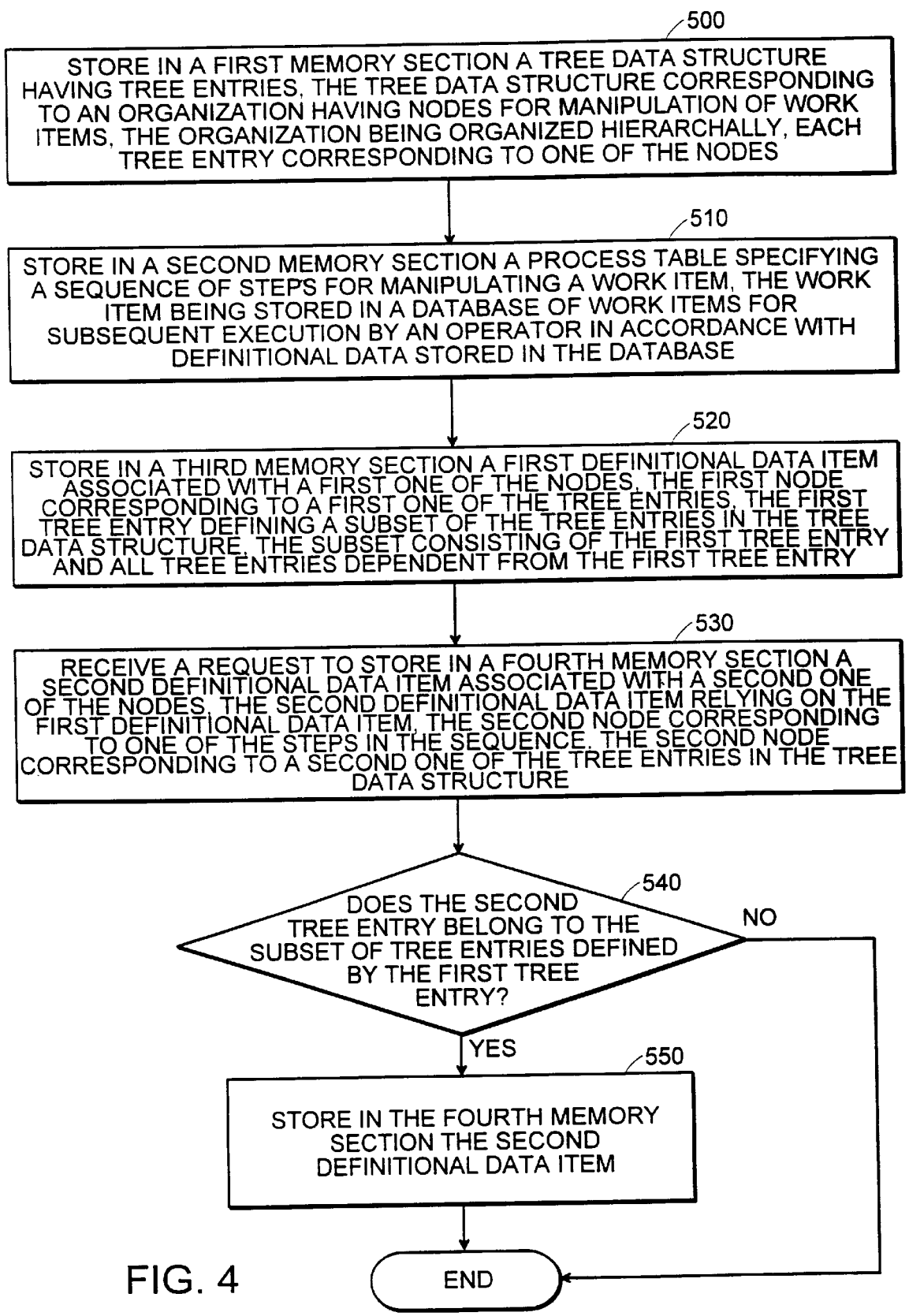

Referring now to FIG. 1, a computer system 16 is shown programmed to execute methods shown in FIGS. 2–4 for controlling access to, or processing of, a work item 10. The work item 10 is stored in a database 14 of work items 10 for subsequent execution by an operator, not shown, belonging to an organization. The operator, here exemplified by a person, may in fact be multiple persons or one or more automated operator computer programs. The database 14 is used by a plurality of organizations, here sub-organizations of the organization. (It should be understood, however, that the organizations need not be organizationally related to each other—the organizations may merely share the database 14 and perhaps also some computing resources associated with the database 14.)

Figure 10:
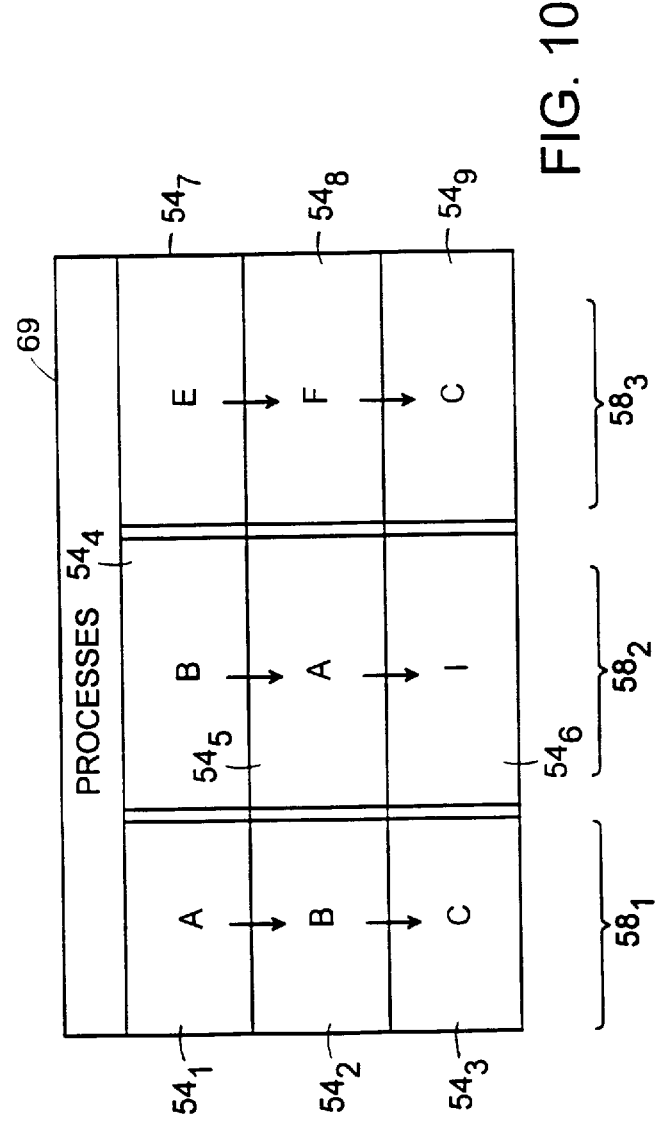
FIGS. 10 and 11 are diagrams useful in understanding the workflow process for the organization having the organizational chart shown in FIG. 8.

Each step in a process, such as processes $58_1$, $58_2$, $58_3$, shown in FIG. 10, for manipulating the work item 10 is performed in each sub-organization by an operator or operators assigned to the sub-organization. The method includes storing in a memory section 37 (FIG. 5), sub-organization identifiers (ORG ID). Each one of sub-organization identifiers (ORG ID) is associated with a corresponding one of the sub-organizations, here divisions, (i.e., DIV1, DIV2, DIV3, and so on) as shown in FIG. 5. Another memory section 39 (FIG. 6) stores a plurality of definitional data items (such as rules 56, 68, 72), each one of the plurality of definitional data items being associated with a corresponding one of the sub-organization identifiers (ORG ID), as shown in FIG. 6. Each one of the definitional data items controls access to, or processing of, the work items. Another memory section 41 (FIG. 7) stores a data structure wherein each one of the operators (OP ID) of the organization is associated with one of the sub-organization identifiers (ORG ID), as shown in FIG. 7. Each one of the operators (such as operators A1, O1, and so on) of the organization is provided with access to, or is affected by, a definitional data item (e.g., rule 56 or 68), only if the data structure stored in the memory section 41 associates said one of the operators with the same sub-organization identifier associated with said definitional data item in the memory section 39. For example, operator O1 belongs to an organization identified by "ORG ID" as "1" (i.e., from the memory section 37 operator O1 belongs to DIV1). Thus, from memory section 39, operator O1 is provided with access to, or is affected by, definitional data items 56, 68, 72, 75 but not definitional data item 77 which is associated with ORG ID "2", here, from memory section 37, DIV2.

More particularly, the work item 10 is stored in the database 14 of work items 10 for subsequent execution by one of a plurality of operators (not shown) at one of a plurality of computer stations 12. The database 14 of work items 10 may be implemented using an Oracle® Pyramid® database system version 7.2. The computer system 16 may include a Pyramids NILEM computer having eight central processing units and two gigabytes of fast-access memory. Here, an operating system such as Data Center Operating System ("DC-OSx") runs on the computer system 16. The computer system 16 also runs a workflow application program 20 providing key functions used to provide a workflow management system as, for example, described by the Workflow Management Coalition in *Workflow Management Coalition Terminology & Glossary* Issue 2.0 (1996), incorporated by reference.

Each one of the computer stations 12 may be a personal computer running an operating system such as Microsoft® Windows® 3.1, Microsoft® Windows®95, or Microsoft® Windows® NT™. The computer system 16 and the computer stations 12 are interconnected across a bidirectional data connection bus 18 such as a network connection provided by a computer network using a TCP/IP protocol.

Referring again to FIGS. 2–4, a work item 10 is stored in the database 14 (step 300). The memory section 37 (FIG. 5) stores an organizations data structure 40 associating a first sub-organization 42 (FIG. 8), here Division 1 (DIV1) of the organization, with a first identifier (i.e., ORG ID), here "1" 44, and also associating a second sub-organization 46 (FIG. 8), here Division 2 (DIV2), with a second identifier, here "2" 47 (step 310). The memory section 39 (FIG. 6) stores another data structure such as a rules data structure 48 associating each one of a plurality of definitional data items (to be described) with one of the identifiers, such as a rule 56 with the first identifier ORG ID 1, which corresponds to DIV1 42 (step 320). The memory section 41 (FIG. 7) stores an operator/administrators data structure 50 associating the operator/administrator with one of the identifiers 44, 47 (step 330). Thus, for example, from the memory section 41, operator (OP ID) A1, having log-in ID A1, is indicated as being an administrator associated with ORG ID 1, and hence, from the memory section 37, with DIV1 42. As shown in FIG. 7, OP ID O2 indicates that such operator/administrator is an operator associated with ORG ID 2 and hence, from the memory section 37, associated with DIV2 46. Each operator/administrator, hereinafter being referred to as an operator, is then provided with access to one of the definitional data items (e.g., the rule 56), or is affected by said one of the definitional data items only if the operators data structure 50 associates the operator with the same identifier (i.e., the first identifier 44) associated with the one of the definitional data items (i.e., the rule 56) (step 340). For example, operator O1 is, from memory section 41, associated with ORG ID 1. From the memory section 37, ORG ID 1 is associated with DIV1 42. Thus, from the memory section 39, operator O1, as well as all members in DIV1, are able to process work items defined by rules 56, 68, 72, 74 and 75. Here, rule 56 defines a NEW ACCOUNT APPLICATION and rule 68 defines a NEW ACCOUNT APPROVAL. Thus, operator O1 can handle new account applications and new account approvals. On the other hand, operator O2 and all other operators belonging to DIV2 are able to process work in accordance with rule 77 because such operators are in DIV2 46. It is noted that as additional sub-organizations such as DIV3 and DIV4 are added to the organization, one merely adds additional ORG IDs, here ORG ID "3" and ORG ID "4", respectively, for the new sub-organizations DIV3, DIV4 to the memory section 37. Then, as operators are added, the memory section 41 associates these new operators, such as OP3, OP4 with the new sub-organizations. Rules for the new sub-organizations may be easily added, removed, or modified in the memory section 39. It is also noted that if a sub-organization is deleted from the organization, or if the organization wished to change the rules, or if the organization wished to add, delete, or change operators, one merely provides proper changes to the appropriate one, or ones, of the memory sections 37, 41, 39.

The use of the three memory sections 37, 41, 39 allows for additional flexibility in controlling access to, or processing of, a work item. More particularly, referring again to FIG. 8, it is noted that each sub-organization 42, 46 is shown with a networked data structure, here a tree data structure, having networked entries, here tree entries. The tree data structure corresponds to an organization, here a sub-organization, having nodes A–L for manipulation of work items. The organization, here sub-organization, is organized hierarchally and each tree entry corresponds to one of the nodes. The nodes A–L correspond to steps used to process a work item and may represent, for example, departments within the sub-organization or persons within a department. For example, if the nodes are departments, departments represented by Nodes E and F report into the department represented by Node B and the department represented by Node B reports into the department represented by Node A. If the nodes are persons in a department, persons represented by Nodes E and F report into the person represented by Node B and the person represented by Node B reports into the department manager represented by Node A.

Figures 8, 9:
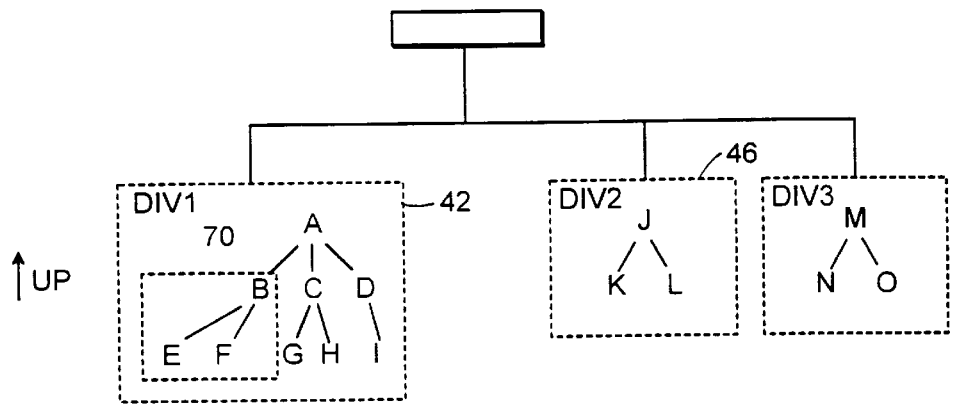
FIG. 8 is an organizational chart useful in understanding features of the invention.
FIG. 9 is a block diagram of a data structure used to control workflow in an organization having the organizational chart shown in FIG. 8.

The networked data structure, here tree data structure 65, appears in an organization data structure 64 stored in another memory section 73 (FIG. 9). Thus, Nodes A–I are shown as belonging within ORG ID 1 (i.e., DIV1 42), and Nodes J–L are shown as belonging within ORG ID 2 (i.e., DIV2 46). Further, Nodes B, C and D are shown as being dependent on Node A; Nodes E and F as being dependent on Node B; Nodes G and H as being dependent on Node C; Node I as being dependent on Node D; and Nodes L and K as being dependent on Node J.

A process table 69 (FIG. 10) specifying sequences of steps for manipulating work items is stored in another memory section (not shown). With one process $58_1$, the work item is to pass from Node A to Node B and then to Node C. In another process $58_2$, the work item is to pass from Node B to Node A to Node I. In a third process $58_3$, the work item is to pass from Node E to Node F and then to Node C.

The memory section 41 (FIG. 7) stores definitional data items (here operators) associated with the nodes. Thus, in this example, the OP ID A1 is associated with Node B, OP O1 with Node K and so forth.

In operation, let it be assumed that a request is received to store in the memory section 39 (FIG. 6) a proposed definitional data item (here a rule) associated with one of the nodes, say Node C, to cause a work item to be transferred to Node C after the work item has been processed by Node B. Let it also be assumed that another definitional data item defining the work item is associated with node B. Because Node C in not dependent on Node B, the request to store the proposed definitional data item (to cause a transfer of the work item to Node C after the work item is processed by Node B) is invalid because such request violates the hierarchial structure 65 established in memory section 73 (FIG. 9). Therefore, the system prevents this "invalid" requested definitional data item from being stored in the memory section 39. Because access and processing control is established in memory section 73 at a time when the workflow system is set up or defined, as opposed to checking each such work item at a subsequent time when such work items are progressing through the system, this method allows a hierarchal organization to easily control access to, or processing of, work items by placing restrictions on definitional data that will be accepted for storage. Thus, access and processing control is made robust by allowing the organization to establish such control at a time when the organization is setting up (i.e., defining) a workflow system for manipulating work items, as opposed to checking each such work item at a subsequent time when such work items are progressing through the system.

Figure 11:
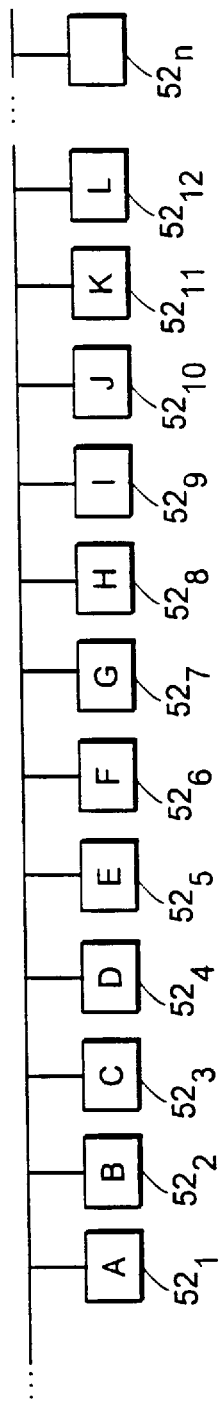

Referring again to FIG. 6, it is noted that the definitional data items (such as the rules 56, 68) may include information about a node, i.e., an "ASSOCIATED NODE". Thus, for example, definitional data item 56 has as an ASSOCIATED NODE, Node A. Referring also to FIG. 11, the system stores a repertoire of nodes $52_1$–$52_n$ available for use in processing the work item. As noted above, each one of the nodes $52_1$–$52_n$ may, for example, correspond to a step in a process. Here, nodes $52_1$–$52_{12}$ correspond to Nodes A–L, respectively, as indicated. By way of example, in exemplary process $58_1$, the sequence of process steps is Node A (i.e., node $52_1$) followed by Node B (i.e., node $52_2$) followed by Node C (i.e., node $52_1$). In exemplary process $58_2$, the process steps are Node B (i.e., node $52_2$) followed by Node A (i.e., node $52_1$) followed by Node I (i.e., node $52_{12}$). It is noted that the same Node, here Node B, may be used in more than one process. Thus, for exemplary process $58_3$, the process follows Nodes E, F and C, sequentially; Node C also being used in process $58_1$. Further, for each of the nodes $52_1$–$52_n$, the operator is able to use the nodes $52_1$–$52_n$ in one of the processes $58_1$–$58_3$ only if the operators data structure 50 (FIG. 7) associates the operator with the same identifier (ORG ID) that is associated with the nodes $52_1$–$52_n$ in a nodes data structure 60 stored in another memory section 175 (FIG. 6). It is noted in comparing the node data structure 60 (FIG. 6) with FIG. 8, that the node data structure 60 is constructed to replicate the organizational relationship shown in FIG. 8. Further, because the nodes data structure 60 (FIG. 6) associates node E with the first identifier 44 (ORG ID "1"), here identifying Division DIV1 42 (FIG. 8), such use of node E is possible only if the operators data structure 50 (FIG. 7) associates the operator with the first identifier ORG ID "1" DIV1 42. Thus, referring to FIG. 7, such use is possible in the cases of operators "Admin1" and "Oper1". For example, operator O2 being in DIV2 46 cannot be associated with, or perform a process step represented by, any one of the Nodes A–I in DIV1 42. Rather, such operator O2, being in DIV2 46, can be associated with Nodes J, K, and/or L.

The definitional data item may include a rule, such as rule 56 (FIG. 6) which specifies a display characteristic (not shown) for the work item 10. For example, the work item 10 may involve a new account application and may have various fields providing information such as an amount of money involved, an account number, a name of an accountholder, an indicator of the work item's status, and a due date. If so, the rule 56 may specify that the account number and the name of accountholder should be displayed on a display screen 62 of the operator's computer station 12 in accordance with a predefined set of codes. Rule 56, however, being associated with ORG ID "1" is not able to be used to display the work item 10 to the operator unless the operators data structure 50 associates the operator with the same identifier that is associated with the rule 56 (i.e., only if the operator is in ORG ID "1", DIV1 42). For instance, because the rules data structure 48 associates the rule 56 with the ORG ID "1" 44 associated with the first sub-organization (DIV1) 42 (FIG. 5), the operator is able to view the work item 10 on the screen 62 of the operator's computer station 12 only if the operators data structure 50 associates the operator with the ORG ID "1" DIV1 44 identifier. Again, such an association exists in the cases of operators "Admin1" and "Oper1".

What applies as described above for the nodes $52_1$–$52_n$ and the rule 56 also applies if the definitional data item includes other information, either in addition to or instead of node or rule information. The other information may include, e.g., information about a characteristic of a queue (not shown) associated with one of the nodes $52_1$–$52_n$. The queue is used to keep track of work items 10 that are appropriate for execution in connection with the one of the nodes $52_1$$52_n$. For example, if Node J $52_{10}$ represents a department responsible for approving purchase orders, the queue may be associated with Node J $52_{10}$ and may keep a list of purchase order work items awaiting approval by the department. In another example, the other information may include information about one or more setup components (not shown) including but not limited to item-type codes, status codes, and value groups. Each setup component is used by an administrator (not shown) of the workflow system to define how operators may interact with a displayed work item 10. For example, the administrator may specify six status codes (including, e.g., "SUBMITTED", "IN PROGRESS", "AWAITING APPROVAL", "APPROVAL DENIED", "APPROVAL GRANTED", and "COMPLETED") for indicating the progress of one of the work items 10 in the workflow system, but may also specify using one of the value groups to restrict one of the operators to selecting from among only three of the six.

More particularly, referring now also to FIG. 8, access control is provided not only between the sub-organizations 42, 46 as described above but also within each of the first and second sub-organizations 42, 46. As mentioned before, the work item 10 is stored in the database 14 (step 400). The memory section 175 (FIG. 6) stores information (such as the nodes data structure 60) defining the nodes 52 and the memory section 73 stores a programmed data structure (such as the structure 65) defining an organizational relationship between a first one of the nodes 52 and a second one of the nodes 52 (step 410). This programmed data structure is then used to provide the organizational relationship between the nodes 52 to control access to, and processing of, the work item 10 by one of the operators (step 420).

As mentioned before, in the operators data structure 50, the operator is associated with one of the nodes $52_1$–$52_n$. For example, in the case of operator "Oper1", the operator is associated with node E $52_5$. As shown in FIG. 8, Node E $52_5$ corresponds to one of the steps, here the step associated with node $52_4$ (specifically "E") in one of the processes 58, here process $58_3$ for manipulating work items 10. The definitional data item (such as a rule) discussed above is associated not only with one of the sub-organizations 42, 46 but also with one of the nodes $52_1$–$52_n$. For example, in the rules data structure 48, rule "Rule1" is associated with node A. As discussed above, the definitional data item may include a rule specifying a display characteristic for the work item 10, information about a characteristic of the operator, or other information, including information about a characteristic of a queue associated with the first one of the nodes $52_1$–$52_n$.

In a particular example executing steps shown in FIG. 4, the organization hierarchy data structure 64 stores the tree data structure 65 having tree entries 66A–I (step 500). The tree data structure 65 corresponds to the first sub-organization 42. The sub-organization 42 is organized hierarchally and each tree entry 66A–I corresponds to one of the nodes A–I $52_1$–$52_9$ in the first sub-organization 42. The process table 69 specifies a sequence of steps (E-F-C) $54_{7-9}$ in one of the processes $58_3$ (step 510). Also stored is the new account approval rule 68 associated with node B $52_2$ (step 520). The new account approval rule 68 defines how a new account approval item (not shown) is displayed on the operator's screen 62. Node B $52_2$ corresponds to tree entry 66B. As shown in FIG. 9, entry 66B defines a subset 70 of the tree entries 66A–66I in the tree data structure 65. The subset 70 consists of entry 66B and all the tree entries dependent on entry 66B (i.e., entries 66E, 66F). FIG. 8 shows how the subset 70 corresponds to a portion of DIV1.

A request is received to store a proposed new rule 72 (step 530). The rule "Rule1" 56 defines how a new account application work item is handled at node E. Executed only if the new account application work item is complete, the proposed new rule 72 is configured to transfer the new account application work item from node E to node F and also to provide the new account approval work item to node F. Such a transfer is intended to allow another operator (not shown) to review the complete new account application and fill out the new account approval work item. Thus, the new rule relies on the new account approval rule 68 and corresponds to step F in the process $58_3$.

Because the new rule 72 is configured for transferring information to node F, the new rule 72 is associated with node F, which corresponds to entry 66F in the tree data structure 65. It is determined whether entry 66F belongs to the subset 70 (step 540). In fact, entry 66F does belong to the subset 70, producing a positive outcome. Based on the positive outcome of the determination, the new rule 72 is stored (step 550).

In another example, another request is received, involving a proposed rule "Rule4" 74. The proposed rule 74 is associated with node C and is intended to transfer the new account application to node C if the other operator indicates approval in the new account approval work item. Thus, like the new rule 72 mentioned before, the proposed rule 74 also relies on the new account approval rule 68, which relates as described above to the subset 70 including entries 66B, 66E, and 66F. As a result, the proposed rule 74 will not be stored, because the proposed rule is associated with node C which corresponds to entry 66C which is not included in the subset 70.

To allow the proposed rule 74 to be stored, at least one of two changes must be made. In the first of the two changes, the proposed rule 74 is changed to cause the new account application to be transferred not to node C but instead to one of the nodes $52_1$–$52_n$, here node B $52_2$, E $52_5$, or F $52_6$, corresponding to one of the entries 66B, 66E, or 66F in the subset 70. This first change allows the proposed rule 74 to be associated with such a node B $52_2$, E $52_5$, or F $52_6$.

In the second of the two changes, the subset 70 is replaced with a larger subset that includes entry 66C. In the case of the first sub-organization 42, the larger subset is defined by entry 66A and in fact includes the entire first sub-organization 42 (DIV1). To gain the larger subset, the new account approval rule 68 is associated in the memory section 39 with node A instead of node B.

As used herein, each of the memory sections (such as memory sections 37, 39, 41, 175, 73) may represent a memory section being physically separate from the others or may represent a logical section of an overall memory (i.e., all memory storage) of the computer system 16. As used herein, each of the memory sections 37, 39, 41, 175 may be made up of any type of data storage media and in fact may be made up of more than one type of data storage media, including volatile data storage media and non-volatile data storage media. Such data storage media types include but are not limited to semiconductor memory (e.g., dynamic RAM, static RAM), magnetic memory (e.g., magnetic tape, hard disk, floppy disk), optical memory (e.g., CD-ROM), and magneto-optical memory (e.g., writable optical disk).

The technique (i.e., the methods described above) may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, one of the sub-organizations 42, 44 may not be simply hierarchal but may instead be matrix-oriented so that at least of the nodes 52 is directly dependent from multiple others of the nodes 52. In addition, whether the operator has access to the definitional data item or is affected by the definitional data item may depend not on whether one of a nodes $52_1$–$52_n$ corresponds to one of entries 66B, 66E, or 66F belonging to the subset 70. Instead, such access may depend on a horizontal position of one of the nodes 52. For example, in the first sub-organization 42, such horizontal positioning divides the nodes 52 into three categories: (1) node A, (2) nodes B, C, D, and (3) nodes E, F, G, H, I. In such a case, whether the operator has access to a particular definitional data item or is affected by the particular definitional data item may depend on whether the operator and the particular definitional data item are associated with the same category.

In addition, the networked data structure may not be a tree data structure but may instead be another type of data structure reflective of nodes organized other than as the hierarchy described above.

Furthermore, the identifiers are not limited to use in logically separating the workflows of multiple sub-organizations of the same organization as described above. The identifiers may also be used for logically separating the workflows of multiple fully-independent organizations. For example, using the identifiers, a workflow services business may use a single work item database supported by a single computer system to manage the workflows of multiple companies even though these companies are not commonly owned and are in fact completely unrelated to each other.

What is claimed is:

1. A system having a computer-readable medium on which are recorded computer programs and data structures for effecting a method for controlling processing of a work item stored in a database of work items for execution by an operator, the database being used by organizations, the operator belonging to one of the organizations, the method comprising:

storing in a memory organization identifiers each associated with a corresponding one of the organizations;

storing in the memory definitional data items, each associated with one of the organization identifiers, the definitional data items defining rules for processing work items;

determining whether to store a new definitional data item based on an associated organizational identifier; and processing a work item according to a rule specified by the definitional data item.

2. The method of claim 1, wherein the method further comprises:

providing one of the operators of the organization with access to, or affecting said operator by, one of the definitional data items only if the data structure stored in a third memory section associates the one of the operators with the same organization identifier associated with the one of the definitional data items.

3. The method of claim 1 wherein the definitional data item comprises information about a node corresponding to a step in a process for manipulating the work item.

4. The method of claim 1 wherein the definitional data item specifies a display characteristic for the work item.

5. The method of claim 1 wherein the definitional data item specifies a transfer characteristic for the work item.

6. The method of claim 1 wherein the definitional data item specifies a processing characteristic for the work item.

7. The method of claim 1 wherein the definitional data item comprises information about a characteristic of the operator.

8. The method of claim 1 wherein the definitional data item comprises information about a characteristic of a queue associated with a node.

9. The method of claim 1 further comprising verifying the rule after the rule is altered, the rule being stored if the rule is compatible with the organization identifiers associated with the set of definitional data items, the rule not being stored if the rule is incompatible with the organization identifiers associated with the set of definitional data items.

10. The method of claim 1 wherein altering the rule further comprises adding the rule.

11. The method of claim 1 wherein altering the rule further comprises deleting the rule.

12. The method of claim 1 wherein altering the rule further comprises changing the rule.

13. The method of claim 1 wherein the rule is defined by a new definitional data item, the new definitional data item being associated with one of the organization identifiers, the new definitional data item being added to the set of definitional data items.

14. The system of claim wherein the method further comprises receiving a request to score a new definitional data item associated with one of the organizational identifiers.

15. The system of claim 1 wherein the method further comprises storing the new definitional data item if the determination is made to store the new definitional data item.

16. A system having a computer-readable medium on which are recorded computer programs and data structures for effecting a method for controlling processing of work items stored in a database for execution by operators belonging to an organization, the method comprising:

storing in a memory information defining nodes available for use in processing the work items, each node associated with a set of rules;

storing in the memory a programmable data structure defining organizational relationship between selected nodes to control the processing of the work item;

providing the organizational relationship between the nodes to control alteration of processing of one of the work items by one of the operators; and executing a process, the process controlling the flow of the work items between at least two nodes of the process according to the set of rules associated with each corresponding node of the process, the process being compatible with the organizational relationship between the nodes.

17. The method of claim 16, wherein the organizational relationship is hierarchal.

18. The method of claim 16, wherein the organizational relationship is matrix-oriented.

19. The method of claim 16, wherein the operator is associated with one of the nodes.

20. The method of claim 16, wherein each node corresponds to a step in the process for manipulating the work item.

21. The method of claim 16, wherein the method further comprises storing a definitional data item, the definitional data item being associated with one of the nodes; and using the definitional data item in a determination about whether to provide the operator with access to the work item.

22. The method of claim 21 wherein the definitional data item specifies a display characteristic for the work item.

23. The method of claim 21 wherein the definitional data item comprises information about a characteristic of the operator.

24. The method of claim 21 wherein the definitional data item comprises information about a characteristic of a queue associated with one of the nodes.

25. The method of claim 21 wherein the definitional data item comprises information about a setup component associated with one of the nodes.

26. The method of claim 25 wherein the setup component comprises an item-type code.

27. The method of claim 25 wherein the setup component comprises a status code.

28. The method of claim 25 wherein the setup component comprises a value group.

29. The method of claim 16 further comprising altering a rule of the set of rules.

30. The method of claim 16 further comprising adding a rule of the set of rules.

31. The method of claim 16 further comprising deleting a rule of the set of rules.

32. A system having a computer-readable medium on which are recorded computer programs and data structures for effecting a method for controlling access to a work item stored in a database of work items for execution by an operator in accordance with definitional data, the method comprising:

storing in a first memory a networked data structure having networked entries, the networked data structure corresponding to an organization having nodes for manipulation of work items, the organization organized hierarchally, each networked entry corresponding to one of the nodes;

storing in a second memory a process table specifying a sequence of steps for manipulating the work item;

storing in a third memory a first definitional data item associated with a first node, the first node corresponding to a first networked entry, the first networked entry defining a subset of the networked entries in the networked data structure, the subset consisting of the first networked entry and all networked entries dependent from the first networked entry;

receiving a request to store in a fourth memory a second definitional data item associated with a second node, the second item relying on the first item, the second node corresponding to one of the steps in the sequence, the second node corresponding to a second networked entry in the networked data structure;

determining whether the second networked entry belongs to the subset of networked entries defined by the first networked entry; and based on the outcome of the determination, storing in the fourth memory the second definitional data item and controlling access to a work item in accordance with the second definitional data item.

* * * * *